United States Patent
Mecocci et al.

(10) Patent No.: US 12,253,132 B2
(45) Date of Patent: Mar. 18, 2025

(54) CALIPER BODY FOR A BRAKE CALIPER

(71) Applicant: BREMBO S.p.A., Curno (IT)

(72) Inventors: Andrea Mecocci, Curno (IT);
Giuseppe Spigapiena, Curno (IT);
Mauro Mambretti, Curno (IT)

(73) Assignee: Brembo S.p.A., Bergamo (IT)

( * ) Notice: Subject to any disclaimer, the term of this patent is extended or adjusted under 35 U.S.C. 154(b) by 478 days.

(21) Appl. No.: 17/595,391

(22) PCT Filed: May 12, 2020

(86) PCT No.: PCT/IB2020/054477
§ 371 (c)(1),
(2) Date: Nov. 16, 2021

(87) PCT Pub. No.: WO2020/234693
PCT Pub. Date: Nov. 26, 2020

(65) Prior Publication Data
US 2022/0213942 A1  Jul. 7, 2022

(30) Foreign Application Priority Data
May 17, 2019  (IT) .......................... 102019000006965

(51) Int. Cl.
*F16D 65/18* (2006.01)
*F16D 55/226* (2006.01)
(Continued)

(52) U.S. Cl.
CPC ........... *F16D 65/18* (2013.01); *F16D 55/226* (2013.01); *F16D 2055/0016* (2013.01);
(Continued)

(58) Field of Classification Search
None
See application file for complete search history.

(56) References Cited

U.S. PATENT DOCUMENTS

| 6,044,936 A | 4/2000 | Matsumoto et al. |
| 8,794,369 B1 | 8/2014 | Cruit |
| 2009/0272606 A1* | 11/2009 | Chelaidite ............... F16D 55/22 |
| | | 188/72.4 |

FOREIGN PATENT DOCUMENTS

| CN | 102292566 B * 12/2014 ............. F16D 65/18 |
| DE | 2326047 A1   12/1973 |

(Continued)

OTHER PUBLICATIONS

European Patent Office, International Search Report, issued in PCT/IB2020/054477, Aug. 21, 2020, Rijswijk, Netherlands.

*Primary Examiner* — Melanie Torres Williams
(74) *Attorney, Agent, or Firm* — Marshall & Melhorn, LLC

(57) ABSTRACT

A caliper body for a brake caliper for a disc brake, arranged straddling a disc, has a first elongated portion configured to face a first braking surface of the disc by interposing at least one first brake pad, a second elongated portion, opposite the first elongated portion and configured to face a second braking surface of the disc by interposing at least one second brake pad. A caliper bridge connects the first and second elongated portions. At least either the first or second elongated portion has a thrust device housing receiving at least one portion of a thrust device, configured to apply a thrust action on at least one brake pad to abut the at least one brake pad against a braking surface of the disc. A first annular housing radially opens into the thrust device housing and receives an elastic retraction element that applies a retracting action on the thrust device.

9 Claims, 12 Drawing Sheets

(51) Int. Cl.
*F16D 55/00* (2006.01)
*F16D 65/00* (2006.01)
*F16D 121/04* (2012.01)
*F16D 127/02* (2012.01)

(52) U.S. Cl.
CPC ...... *F16D 65/0068* (2013.01); *F16D 2121/04* (2013.01); *F16D 2127/02* (2013.01)

(56) References Cited

FOREIGN PATENT DOCUMENTS

| | | | | |
|---|---|---|---|---|
| EP | 1561679 | A1 * | 8/2005 | ............. B62L 1/005 |
| EP | 2370707 | B1 | 5/2014 | |
| FR | 2798974 | A1 | 3/2001 | |
| GB | 2129878 | A † | 5/1984 | |
| JP | 106249275 | A | 9/1994 | |
| JP | H06249274 | A | 9/1994 | |
| JP | 107301264 | A | 11/1995 | |
| JP | H06249275 | † | 10/2001 | |
| JP | H07301264 | † | 7/2002 | |

\* cited by examiner
† cited by third party

CALIPER BODY FOR A BRAKE CALIPER

CROSS-REFERENCE TO RELATED APPLICATIONS

This application is a National Phase Application of PCT International Application No. PCT/IB2020/054477, having an International Filing Date of May 12, 2020 which claims priority to Italian Application No. 102019000006965 filed May 17, 2019, each of which is hereby incorporated by reference in its entirety.

FIELD OF THE INVENTION

The present invention relates to a caliper body for a brake caliper.

Furthermore, the present invention relates to a brake caliper for a disc brake.

PRIOR ART

In a disc brake, the brake caliper is generally arranged straddling the outer peripheral margin of a brake disc, adapted to rotate about a rotation axis defining an axial direction (X-X). In a disc brake, a brake disc radial direction (R-R), which is substantially orthogonal to said axial direction (X-X), and a tangential direction (T-T), orthogonal to both said axial direction (X-X) and said radial direction of the disc brake (R-R), is further defined.

Brake pads generally comprise a pad onto which friction material is fixed, adapted to press against a facing braking surface of the braking band of the brake disc.

A brake caliper of known type comprises a caliper body specifically designed to offer sufficient rigidity and avoid the caliper from being deformed because of the forces with arise during the braking action. Deformations of this type are highly undesirable in the caliper because they make the braking ineffective, absorbing part of the action applied on the brake fluid, e.g. by the brake pedal, in the deformation.

In floating caliper bodies associated with fixed discs, a floating portion of the caliper body has a cylinder, or cylinders, adapted to accommodate hydraulic pistons capable of applying a thrust action on the friction pad facing it, abutting it against the braking surface of the disc, while sliding on the bracket, or fixed portion of the caliper, and acts on the second clutch pad abutting it against the brake disc to apply the braking action on the motor vehicle.

In fixed caliper bodies associated with fixed discs, a cylinder, or cylinders, is or are present on both opposed sides of the caliper body, adapted to accommodate hydraulic pistons capable of applying a thrust action on the friction pads facing it, abutting both the opposite brake pads against the opposite braking surface of the disc to apply the braking action on the vehicle.

Conversely, floating caliper bodies associated with fixed discs are also known, in which only one of the elongated portions of the caliper body has cylinders adapted to apply a thrust action on the friction pad facing it, making it abut against the braking surface of the disc, and by reaction it slides axially on its support, typically two supports and in turn abuts the second friction pad against the disc braking surface to apply the braking action on the vehicle.

Typically, in hydraulically actuated brake calipers, the pressure applied by the vehicle driver on the brake pedal applies, through a brake master cylinder, a brake fluid pressure which through a pipe is applied to the brake fluid present in the hydraulic circuit placed inside the caliper body to reach the cylinders where the pressure is applied onto the bottom surface of the pistons, thereby forcing them to be close against the pads, which in turn abut against the braking surfaces of the disc.

The pressure action of the brake fluid is also applied on the bottom wall of the cylinder, thereby causing a reaction in the caliper body which deforms it away from the disc surfaces. The caliper body thus deforms also as a function of the torque applied by the action of the pistons which make the pads abut against the braking surfaces of the disc, applied in directions which form torque arms with respect to the fixing points of the caliper body to its support. These torques also deform the caliper body in a tangential and radial direction with respect to the disc, as well as an axial direction. This deformation of the caliper body leads to an increase of piston stroke, and thus to an increase of brake pedal stroke.

Typically, in electrically actuated brake calipers, the braking control applied by the vehicle driver results in a sequence of electrical signals for the activation of an electric motor, which in turn is operationally connected to a ball screw assembly, in which the nut by moving on the screw acts as a piston which, sliding axially with respect to the caliper body applies the thrust action on the friction pad facing it.

When the braking action ceases, and thus when the bias which is created and deforms the caliper body away from the brake disc ceases, the caliper body returns to its undeformed resting configuration, approaching the brake disc again, and thus approaching the pads to the braking surfaces.

Such approaching of the pads to the brake disc is sometimes undesired because it determines a contact, albeit minor, between pad and disc, which causes continuous minor friction and thus a braking action, also known as residual braking torque, also when the braking command by the driver of the vehicle ceases.

The residual braking torque is often considered undesired because it generates noise, albeit minor, caused by the friction action between pads and disc braking surfaces, undesired wear of the pads and the brake disc, and implies more frequent maintenance for their replacement, and minimum fuel consumption for feeding the drive unit with the energy, even if minimum, needed to overcome this residual torque.

Partially, this phenomenon known as elastic deformation or "strain" of the brake caliper is compensated by providing rollback devices in the piston-cylinder interface, which retract the piston into its cylinder by a limited predetermined entity, moving it away from the respective pad and thus allowing the pad, biased in turn by an axial spring, to move away from the disc, reducing the undesired residual torque.

The amount of axial distance (X-X) of the piston from the back of the respective pad when the braking action ceases defines an axial distance called "luft".

It is desirable for said axial luft distance to be kept within permissible values during the entire service life of the brake pads.

When the brake pad has become thinner due to prolonged use, the piston must increase its stroke by protruding further from the cylinder to compensate for the reduction in axial thickness of the brake pad friction material.

Furthermore, in hydraulically actuated brake calipers, the piston pulling force is biased by the pressure of the brake fluid which pushes the piston itself, and therefore the brake pad facing it, during the braking action. A prolonged braking action, e.g. necessary for major vehicle decelerations, requires a considerable increase in brake fluid pressure. It is estimated that in some cases, such pressure can activate and reach and even exceed 100 bar.

The drag applied on the roll-back elastic element by the piston sliding with respect to the cylinder can cause the piston to slip with respect to the roll-back elastic element, with a consequent loss of retractable capacity of the system, particularly when the pressures in play are high.

Such piston slip phenomena necessarily bias the axial luft distance value, as well as pad wear.

The elastic deformation of the caliper body also biases the axial luft distance value. Indeed, there is typically a deterioration in the retraction performance of the piston on the side of the caliper body opposite to the fixing means the brake caliper to the vehicle.

Typically, a roll-back elastic element is in the form of an elastomeric ring with a substantially constant section. Knock-back elastic elements are also known to apply an elastic force on the piston to bring it closer to the back of the brake pad facing it. Usually, said knock-back and said roll-back spring elements are integrated into a single spring ring and their function is determined by the geometry of the annular housing and the deformation chambers.

Various geometries of the annular housing which receive the roll-back elastic element have been suggested.

A solution of roll-back spring element received inside a dedicated annular housing surrounding the brake caliper piston is shown, for example, in document U.S. Pat. No. 6,044,936 in which a roll-back deformation chamber is made on the side of the annular housing facing the disc brake disc. Such deformation chamber accommodates a predetermined portion of the roll-back elastic element during its elastic deformation approaching the disc when fed in the axial direction (X-X) by the piston which applies the thrust action on a brake pad. The extension in the axial direction (X-X) of such deformation chamber is chosen to obtain the desired elastic retracting action.

For example, document U.S. Pat. No. 8,794,369 shows a housing bottom wall having a characteristic saddle shape, in which a radial relief acts as a stop element to oppose the axial deformation (X-X) of a part of the elastic element. Such a solution, however, causes a concentration of strains in the radially external peripheral portion of the body of the elastic element which is repeatedly in contact and rubbing against this radial relief which acts as a stop. In this manner, the elastic element undergoes a rapid progressive deterioration of its functionality.

For example, document, JP-H06249274 shows an annular deformation chamber placed radially outside of the annular housing which receives the roll-back spring element when it is in the undeformed configuration.

Document EP-2370707 by the Applicant shows a solution in which the deformation chamber is obtained by installing an additional annular component axially placed between the roll-back elastic element and the wall of the annular housing facing axially in the direction of the disc.

However, the known solutions described above are not without drawbacks, because they are not able to keep the axial luft distance value within permissible values, e.g. when the brake fluid pressure is high.

Furthermore, the walls of such deformation chamber form edges facing the side of the roll-back elastic element which is deformed when fed by the piston. Such edges can generate strain concentration on the elastic roll-back element during the movement of the piston towards the brake pad facing it, and thus the disc.

The need is strongly felt to provide a solution capable of providing an elastic retracting action of the piston with respect to the caliper body of improved effectiveness compared to known solutions, without increasing the number of components of the disc brake system.

The need is felt to keep the axial luft distance within a range of permissible values even during prolonged braking.

Solution

It is an object of the present invention to solve the drawbacks of the prior art and to provide a solution to the needs described hereto with reference to the prior art.

A further object is to reduce the residual braking torque of the caliper, reduce the noise of the disc brake in absence of braking and reduce the pads and brake disc wear.

These and other objects are reached by a caliper body as described and claimed herein.

Some advantageous embodiments are the object of the dependent claims.

The suggested solutions can be applied to cars, race cars, as well as race cars, motorcycles, as well as motorcycles, scooters, motorbikes, motorcycles or scooters with three or more wheels and other three-wheel motor vehicles as well as snowmobiles.

FIGURE

Further features and advantages of the caliper body will be apparent from the description provided below of preferred embodiments thereof, given for illustrative but not limiting purposes, with reference to the accompanying drawings, in which.

Figure 1:
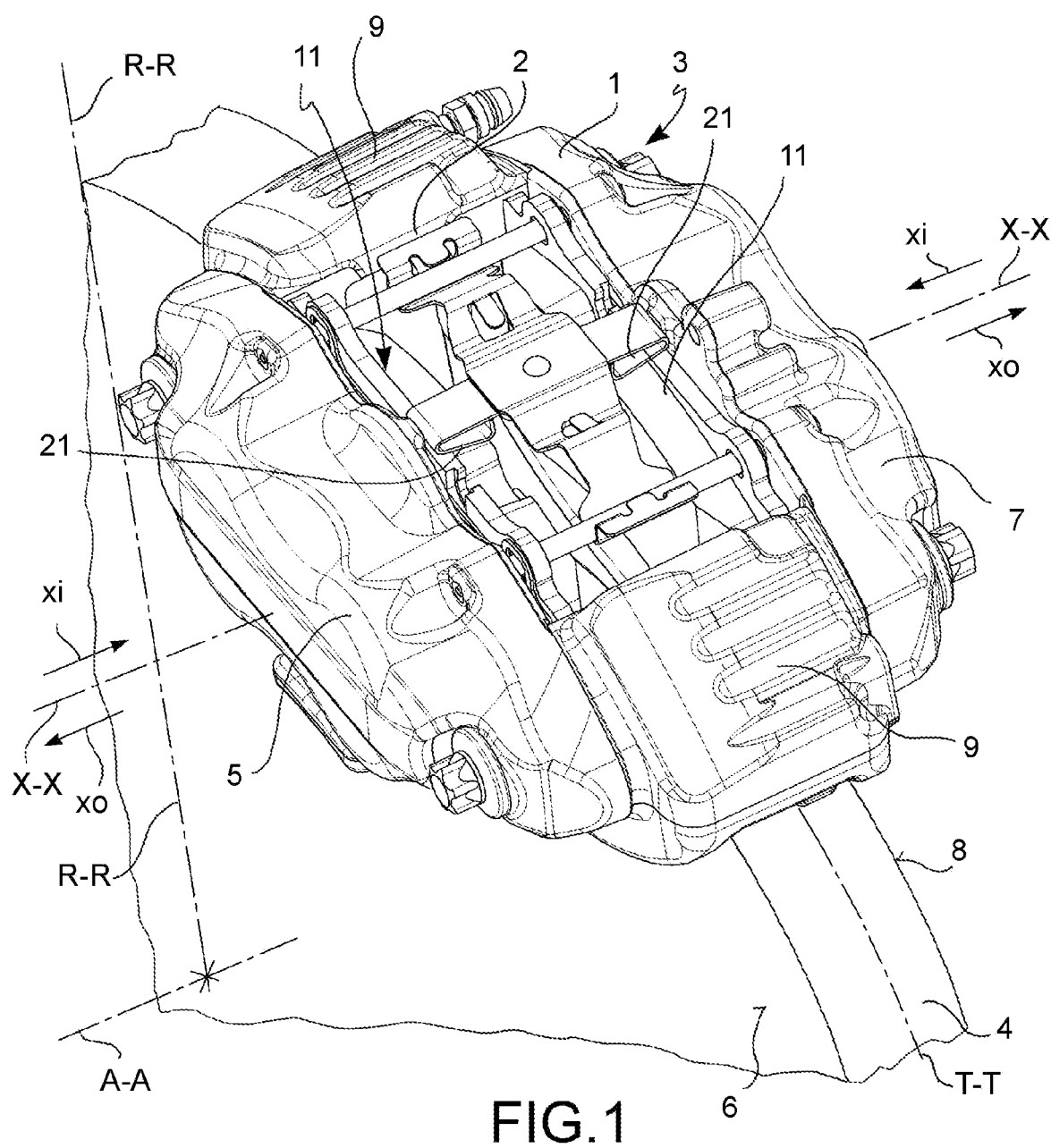
FIG. 1 is an axonometric view of a disc brake according to a further embodiment.
Figure 2:
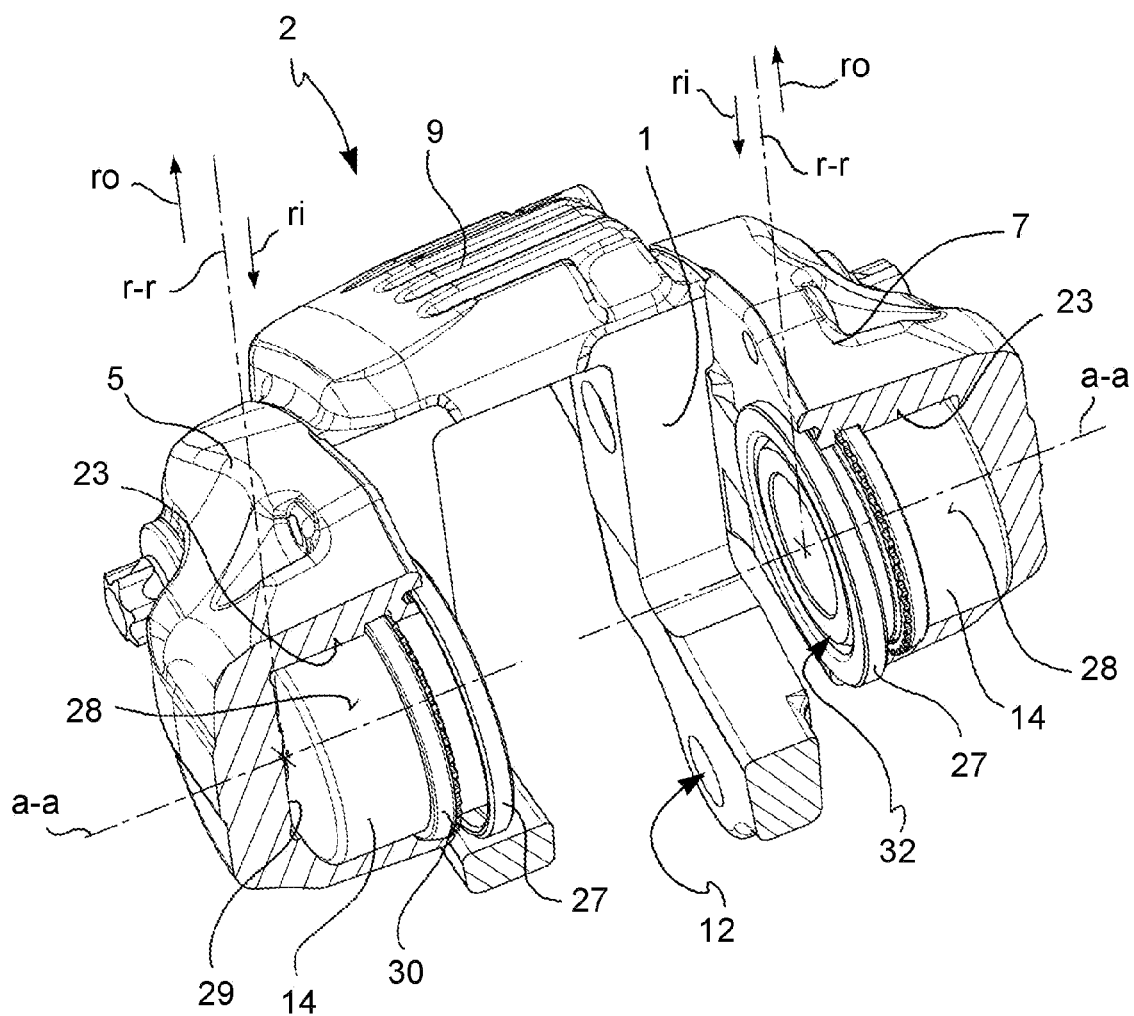
FIG. 2 is an axonometric cross-section view of a caliper body, according to an embodiment, with which thrust means are associated.
Figure 3:
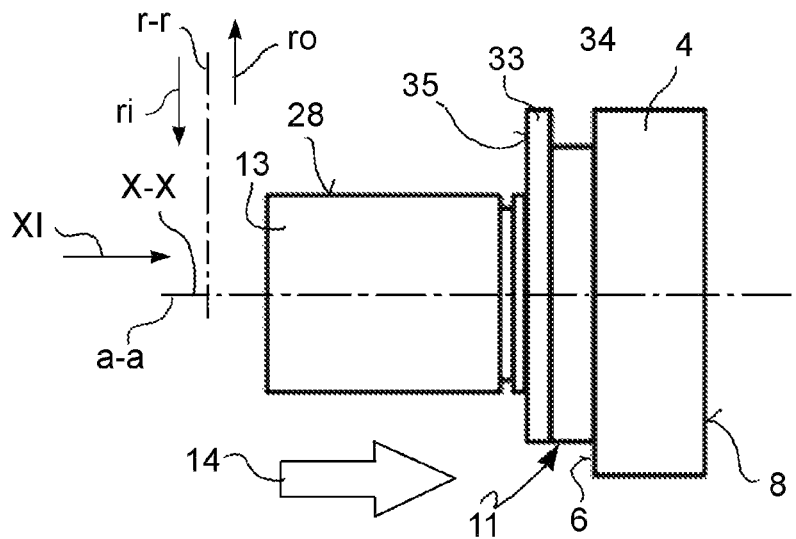
FIGS. 3, 4 are diagrammatic views illustrating the braking action.
Figure 4:
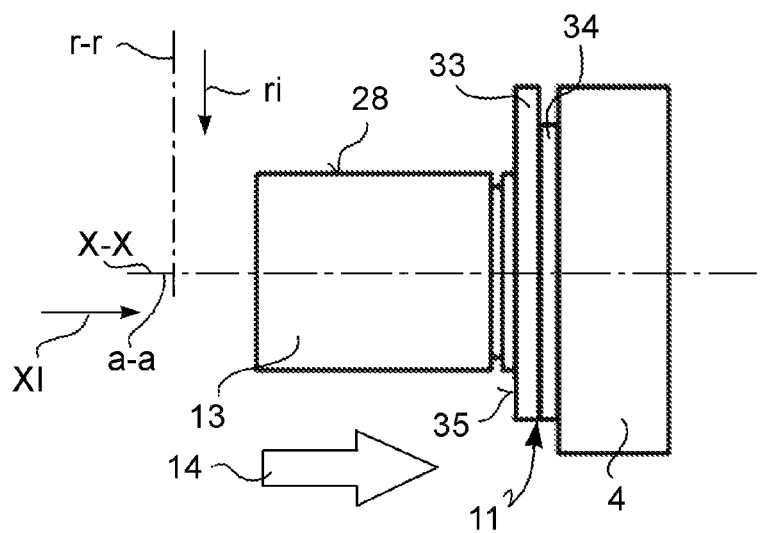
Figure 5:
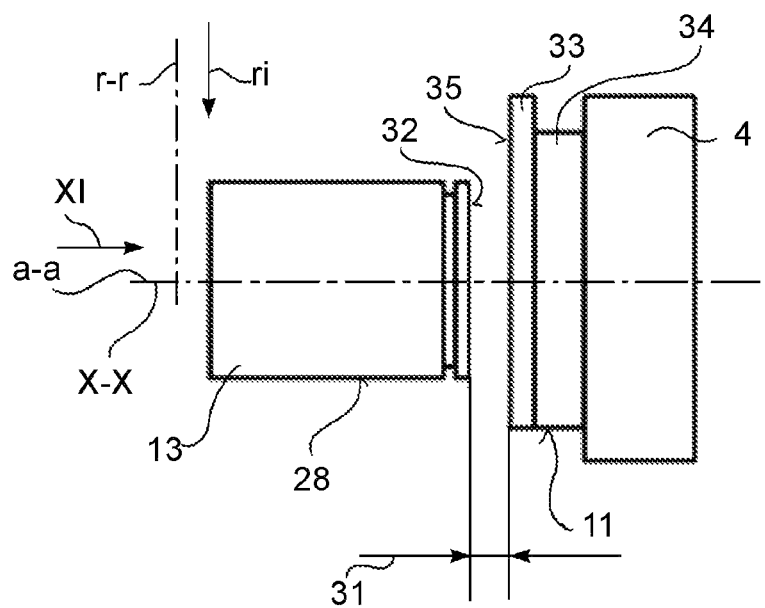
Figure 6:
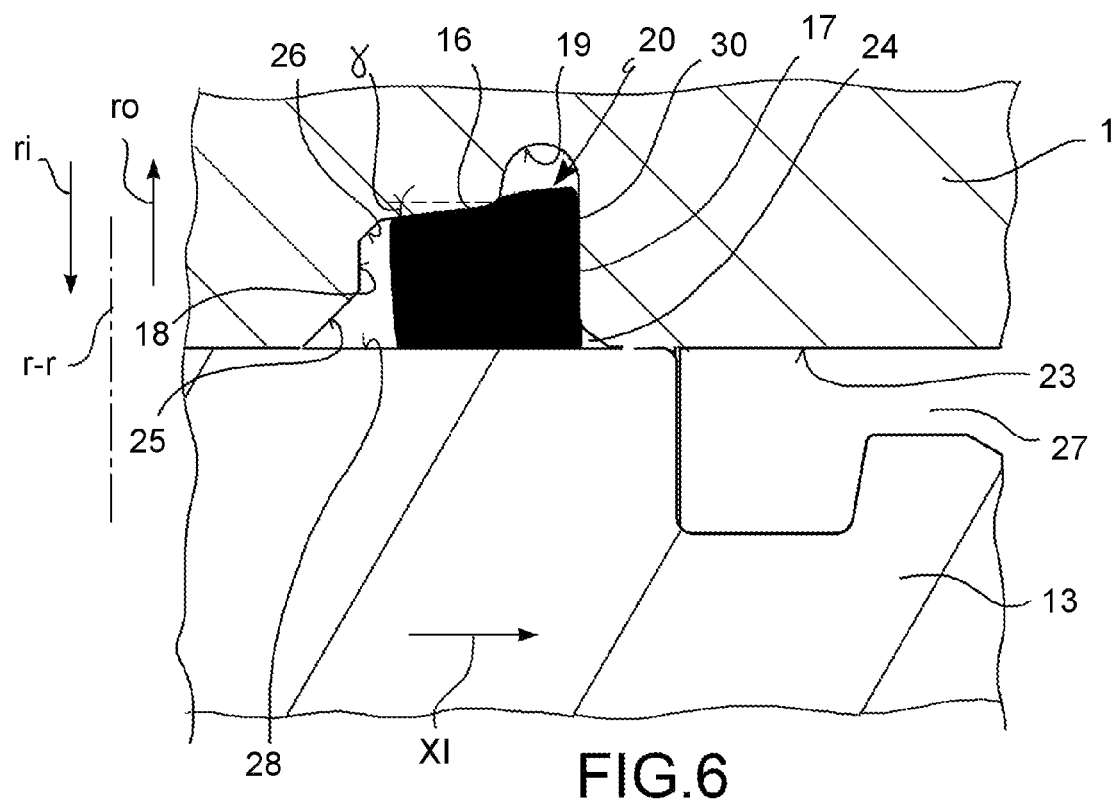
Figure 7:
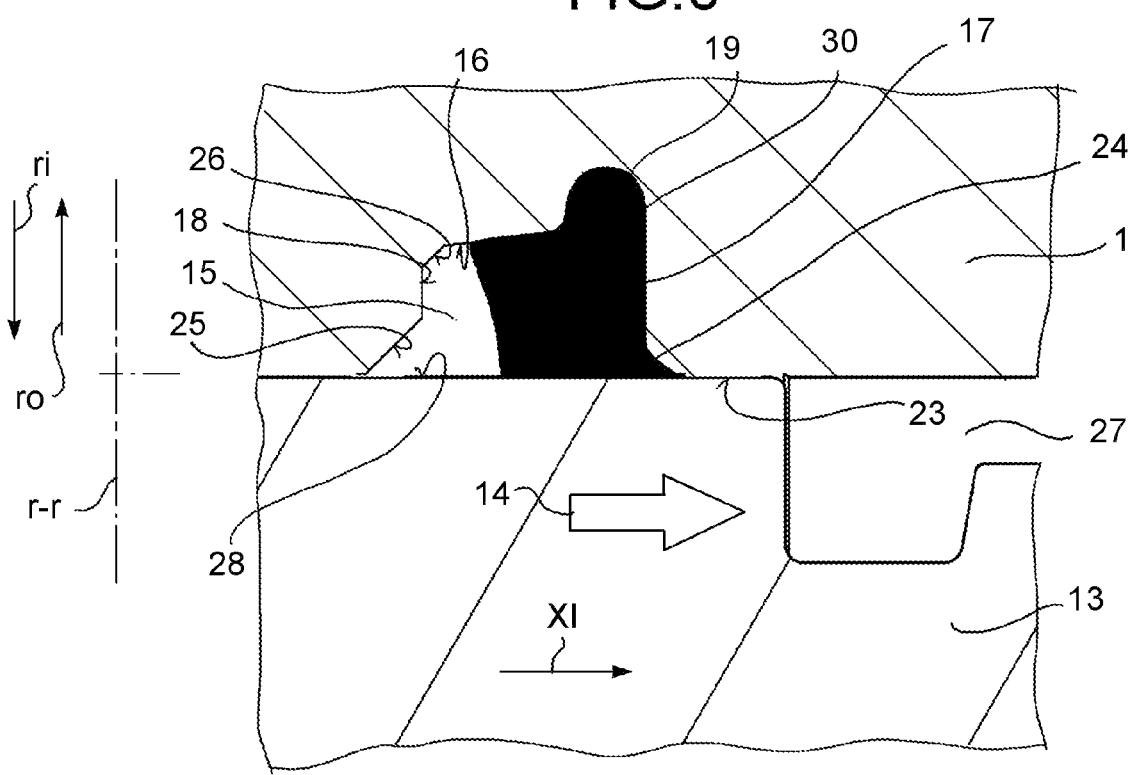
Figure 8:
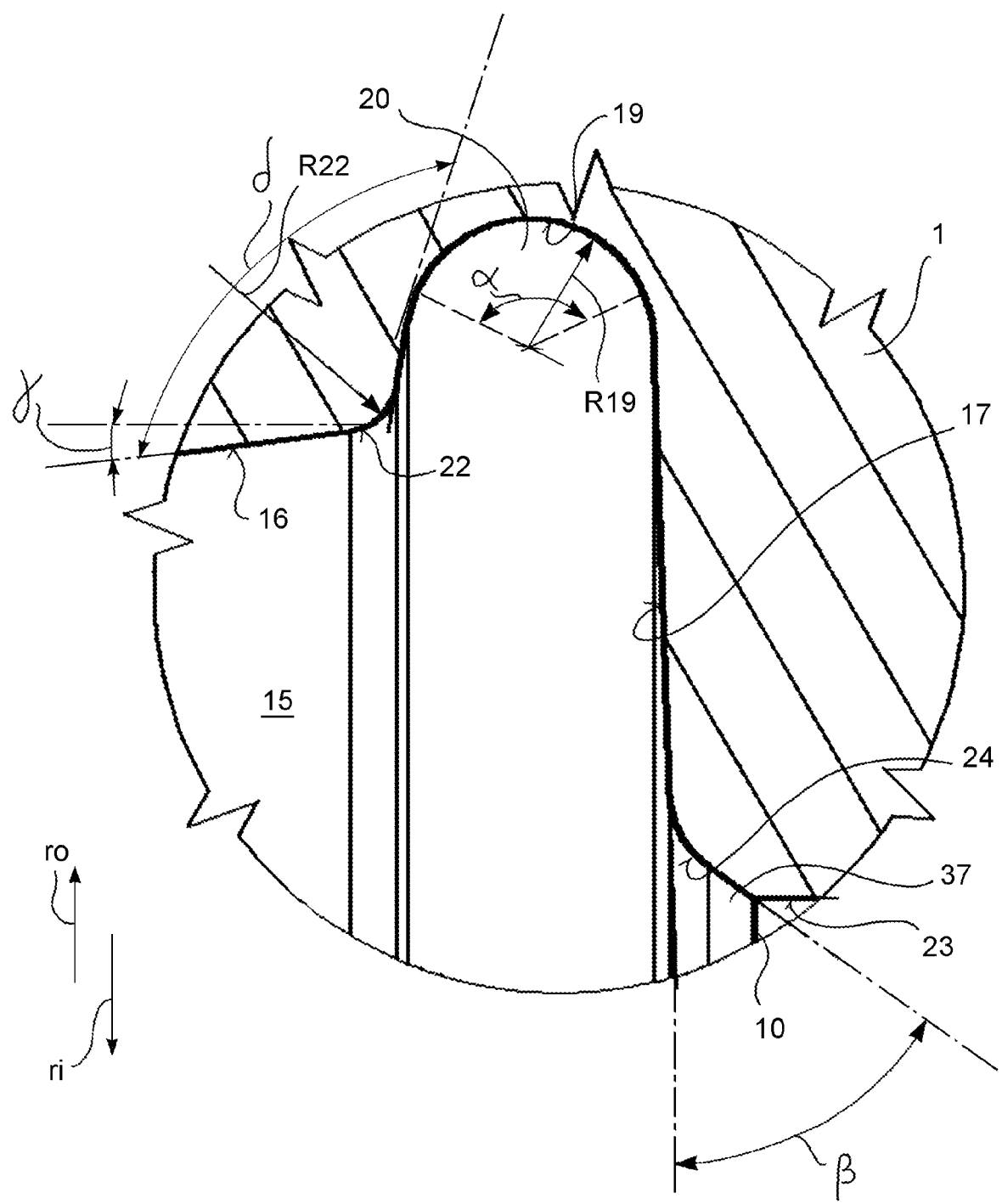
Figure 9:
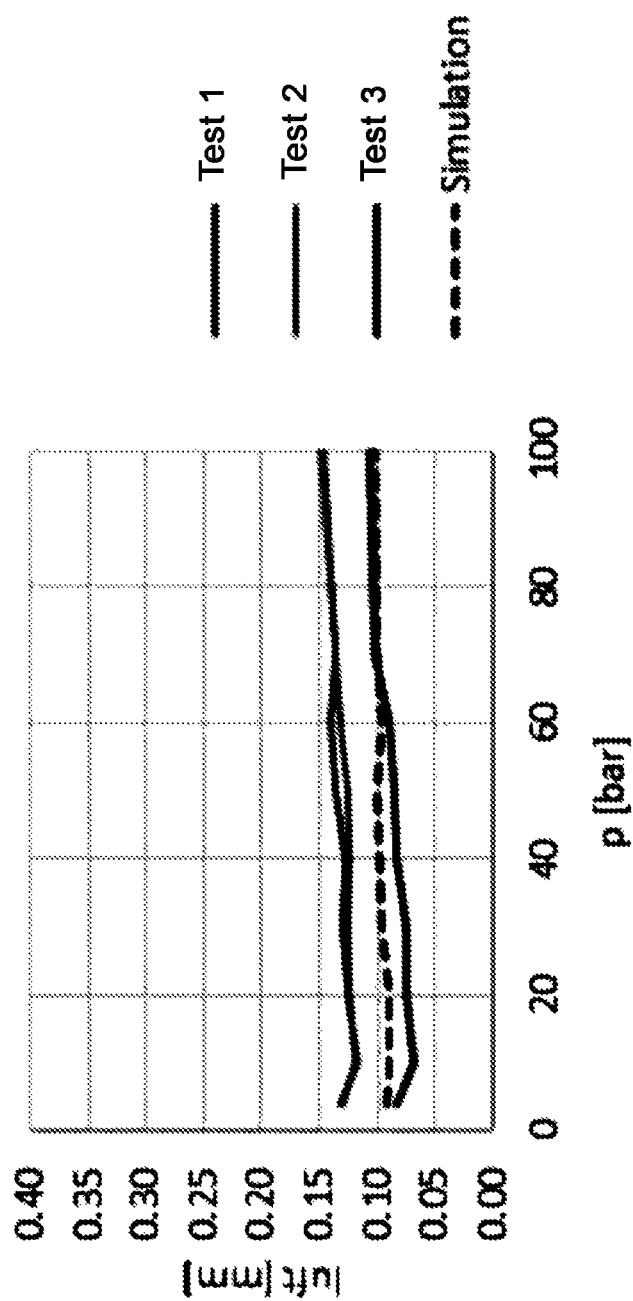
Figure 10:
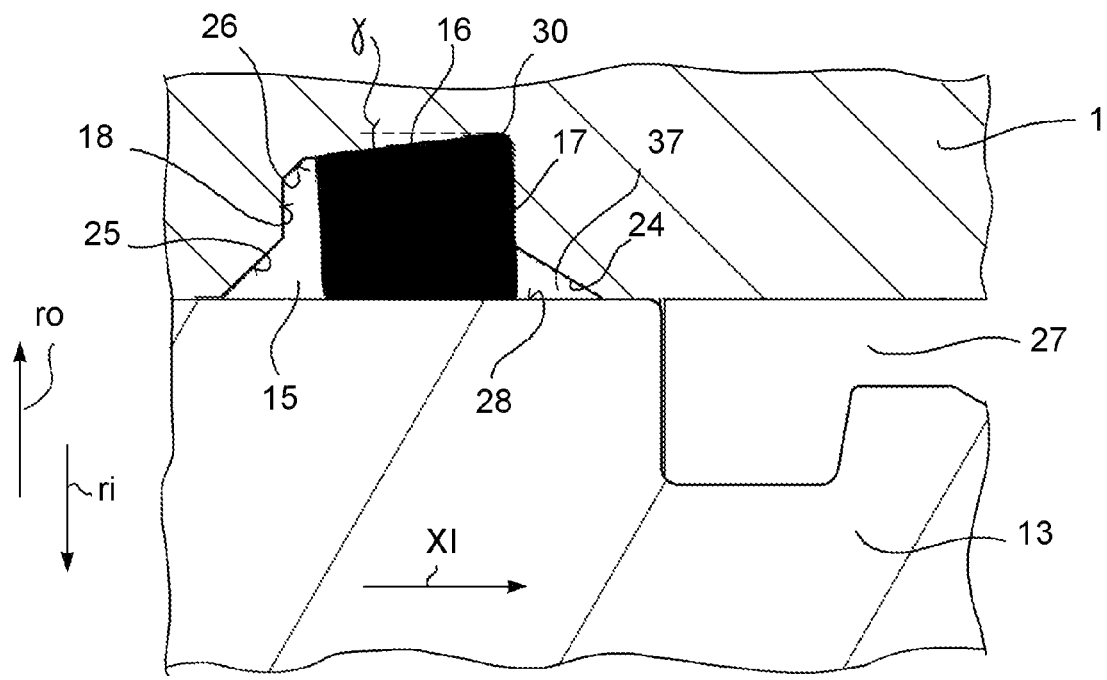
Figure 11:
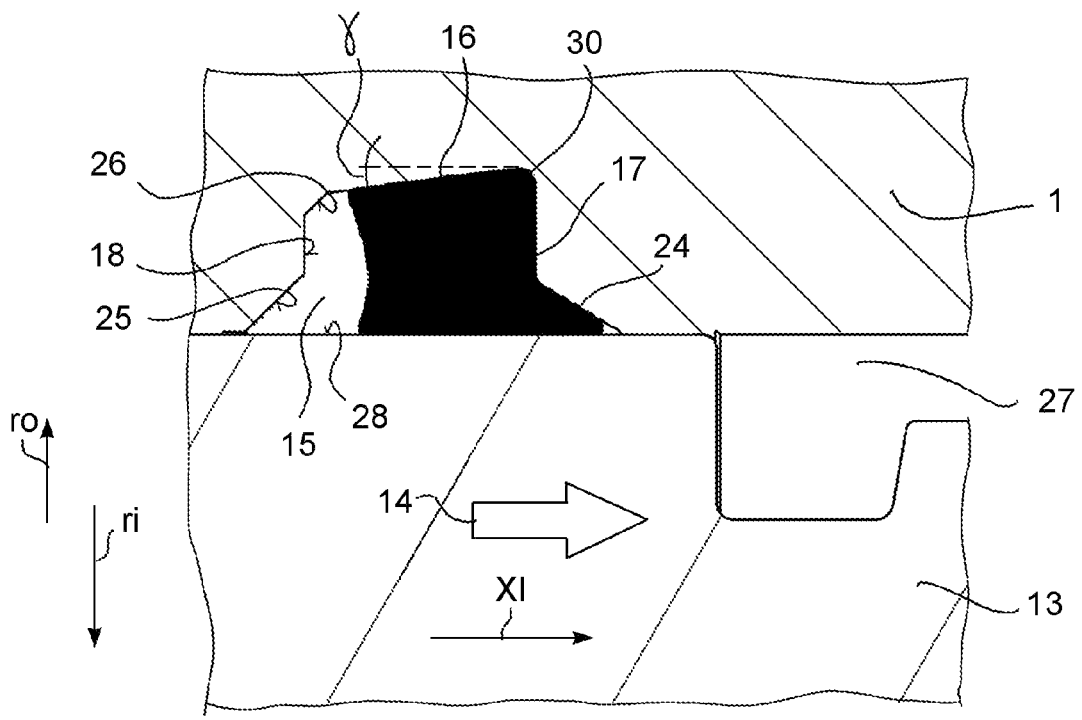
Figure 12:
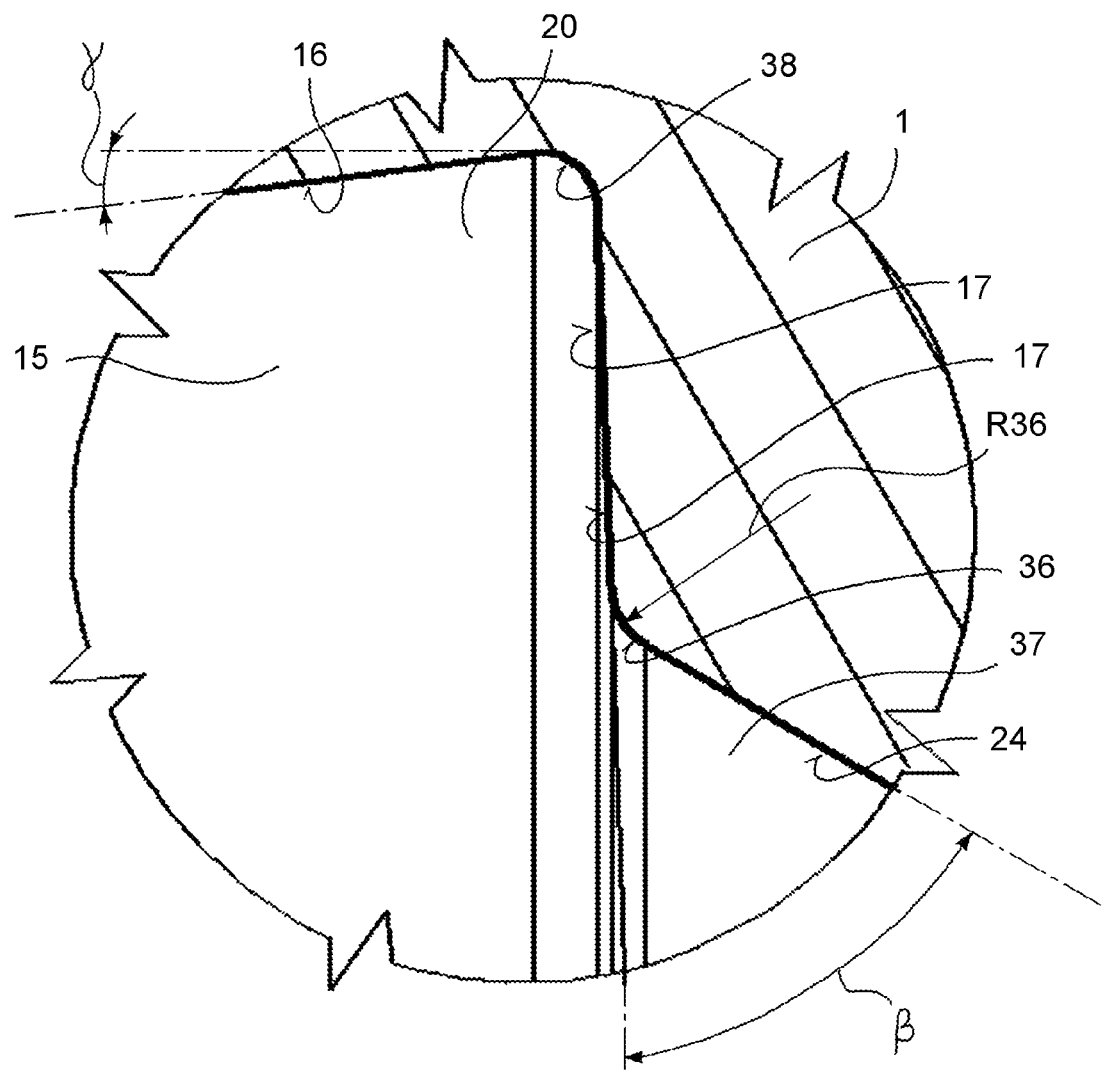
Figure 13:
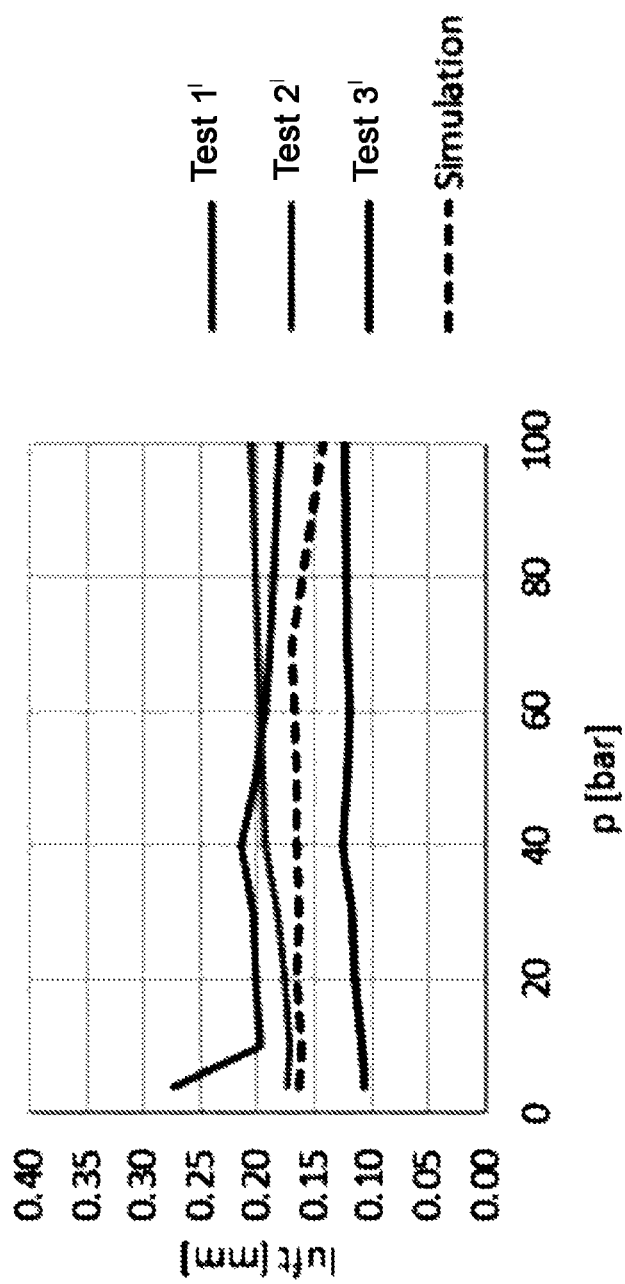
Figure 14:
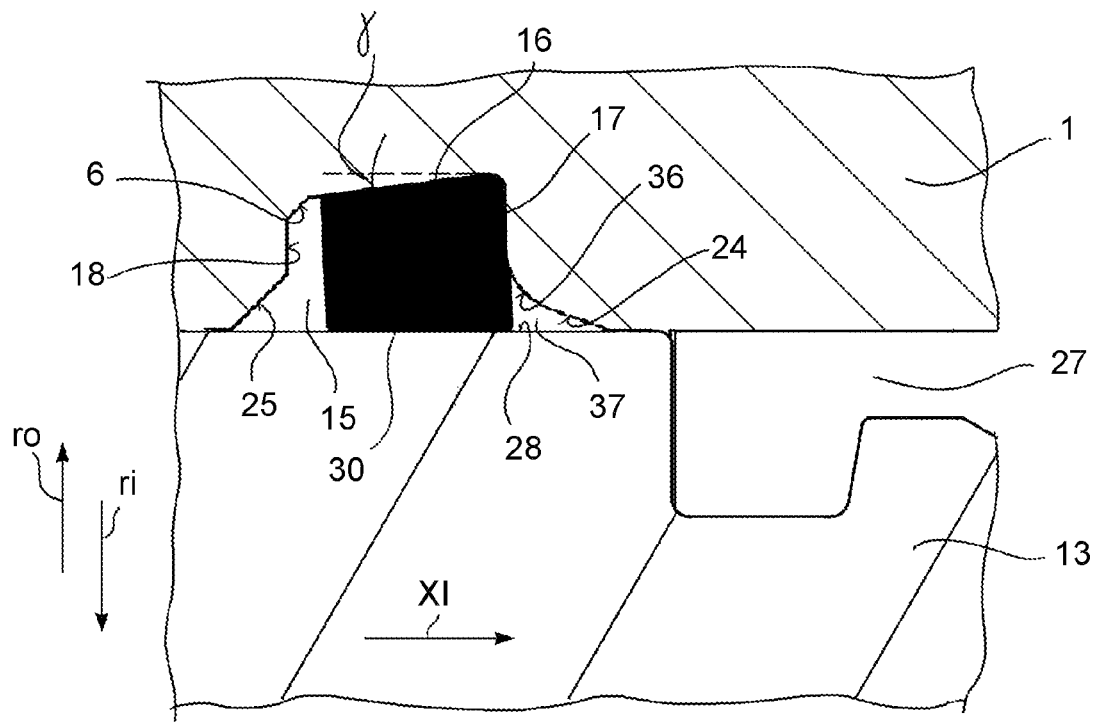
Figure 15:
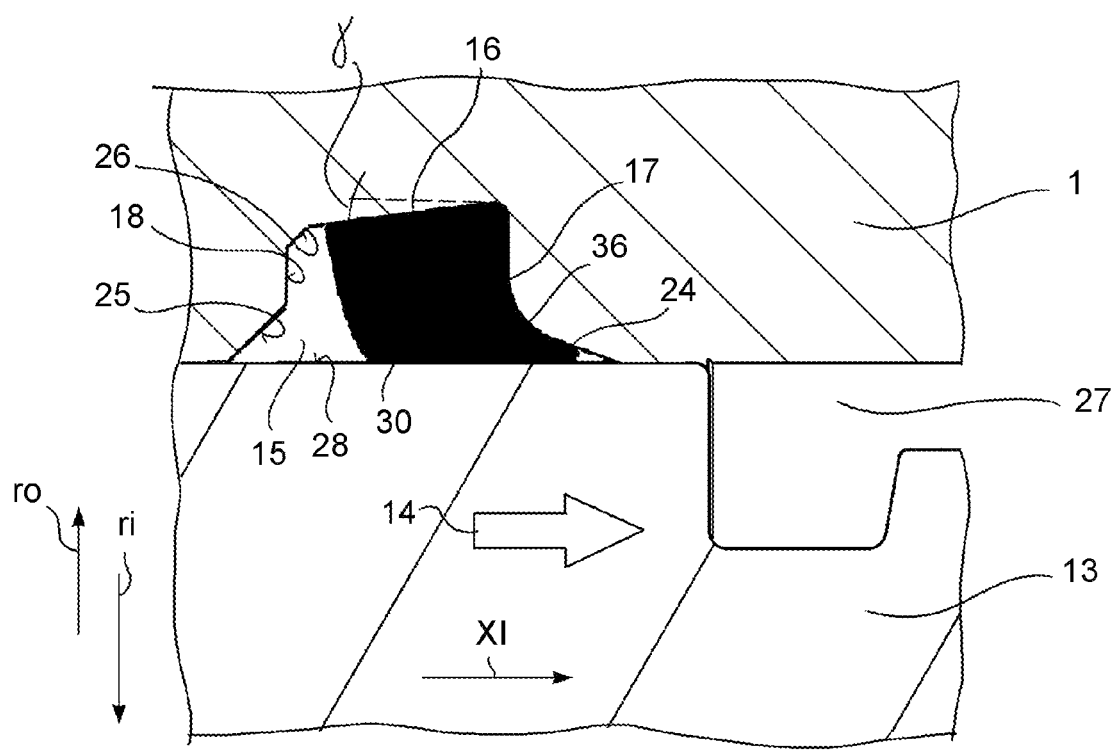
Figure 16:
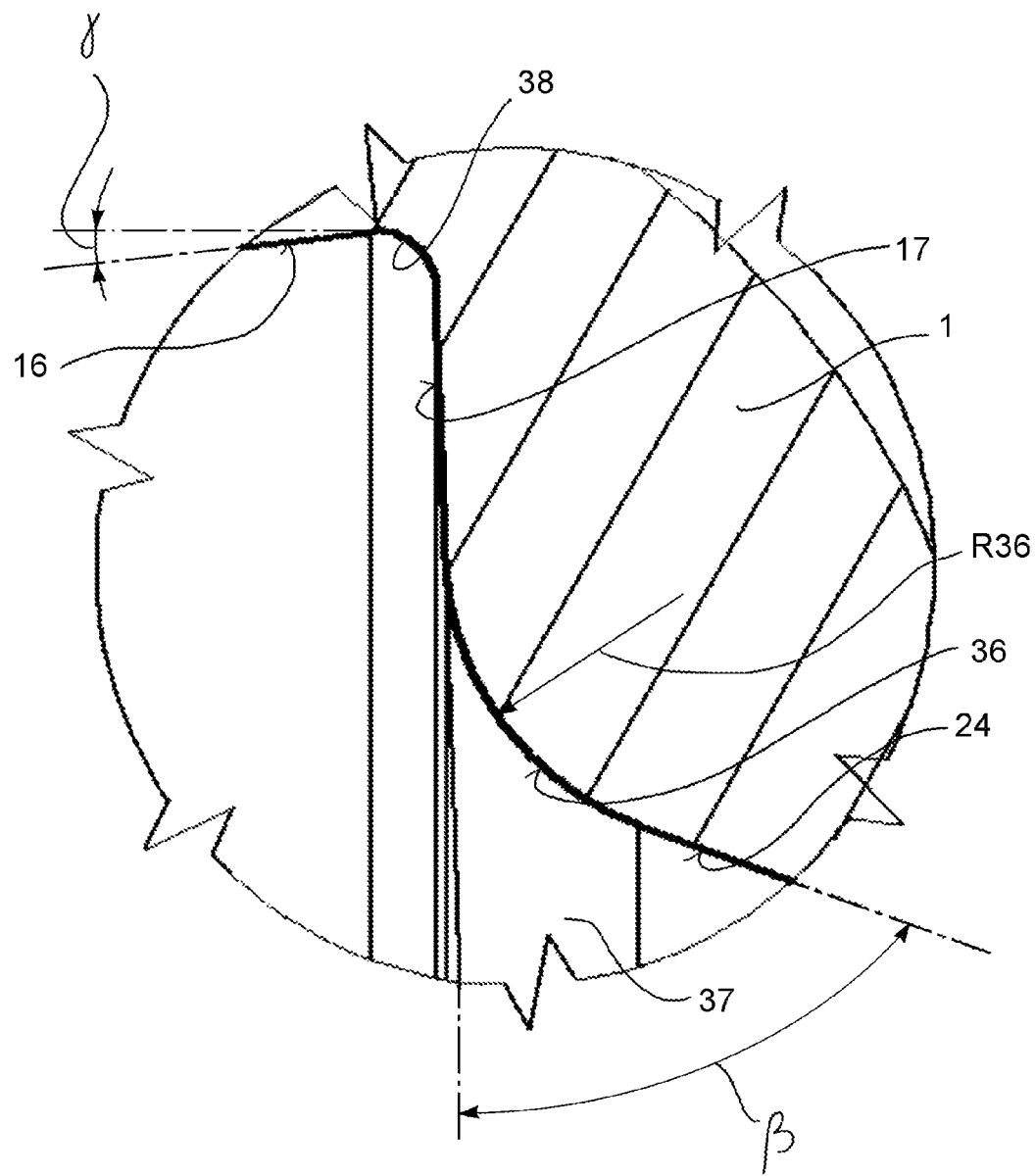
Figure 17:
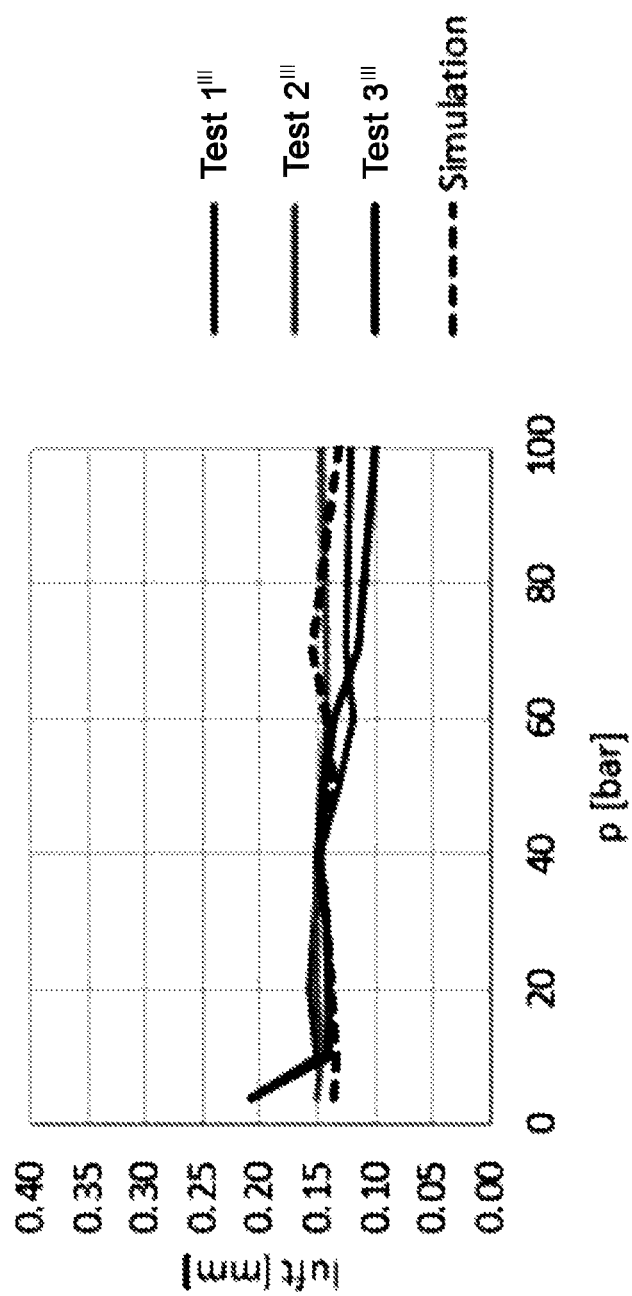

FIG. 5 diagrammatically shows the axial luft distance;

FIG. 6 is a cross-section view of a portion of a brake caliper comprising a caliper body, according to an embodiment, wherein an elastic retraction element is shown in an undeformed condition;

FIG. 7 shows the portion of the brake caliper in FIG. 6 wherein the elastic retraction element is in a deformed condition;

FIG. 8 shows a portion section of the caliper body in FIGS. 6 and 7;

FIG. 9 is a graph which shows the pattern of the axial luft distance in a brake caliper in FIGS. 6 and 7 as a function of the brake fluid pressure;

FIG. 10 is a cross-section view of a portion of a brake caliper comprising a caliper body, according to an embodiment, wherein an elastic retraction element is shown in an undeformed condition;

FIG. 11 shows the portion of the brake caliper in FIG. 10 wherein the elastic retraction element is in a deformed condition;

FIG. 12 shows a portion section of the caliper body in FIGS. 10 and 11;

FIG. 13 is a graph which shows the pattern of the axial luft distance in a brake caliper in FIGS. 10 and 11 as a function of the brake fluid pressure;

FIG. 14 is a cross-section view of a portion of a brake caliper comprising a caliper body, according to an embodiment, wherein an elastic retraction element is shown in an undeformed condition;

FIG. 15 shows the portion of the brake caliper in FIG. 14 wherein the elastic retraction element is in a deformed condition;

FIG. 16 shows a portion section of the caliper body in FIGS. 14 and 15;

FIG. 17 is a graph which shows the pattern of the axial luft distance in a brake caliper in FIGS. 14 and 15 as a function of the brake fluid pressure;

DESCRIPTION OF SOME PREFERRED EMBODIMENTS

According to a general embodiment, a caliper body 1 for a brake caliper 2 for disc brake 3 is provided.

In a disc brake 3 an axial direction X-X is defined either coinciding with or parallel to the rotation axis A-A—of the disc 4 of the disc brake 3, a brake disc radial direction R-R orthogonal to the axial direction X-X, and a tangential direction T-T, orthogonal to both the axial direction X-X and to the brake disc radial direction R-R.

The axial direction X-X defines an inner axial direction XI, directed towards the disc 4, and an outer axial direction XO, opposite with respect to said inner axial direction XI.

Said caliper body 1 is adapted to straddle the disc 4.

Said caliper body 1 comprises a first elongated portion 5 adapted to face, either directly or indirectly through the interposition of at least one brake pad 11, a first braking surface 6 of the disc 4, and a second elongated portion 7, opposite to said first elongated portion 5 and adapted to face, either directly or indirectly through the interposition of at least one brake pad 11, a second braking surface 8 of the disc 4 opposed to said first braking surface 6.

Said caliper body 1 further comprises at least one caliper bridge 9 to connect said first elongated portion 5 and said second elongated portion 7 to each other arranged straddling the disc 4.

At least either said elongated portion 5 or said second elongated portion 7 comprises at least one thrust device housing 10, or cylinder 10, adapted to receive at least one portion of a thrust device 13 or piston 13, adapted to apply a thrust action 14 directed in inner axial direction XI on at least one facing brake pad 11 to abut said at least one facing brake pad 11 against a braking surface 6, 8 of the disc 4.

Said at least one thrust device housing 10 extends about a thrust axis a-a, parallel to the axial direction X-X, and defines a radial thrust direction r-r orthogonal to said thrust axis a-a and incident thereto. Said radial direction r-r defines an outer radial direction rI directed towards said thrust axis a-a and an outer radial direction rO, opposite to said inner radial direction rI. A circumferential direction of thrust device c-c, orthogonal to said thrust axis a-a, and said radial direction r-r, is also defined.

According to a preferred embodiment, at least either said elongated portion 5 and said second elongated portion 7 comprises a first annular housing 15 which radially opens into said thrust device housing 10.

According to a preferred embodiment, said first annular housing 15 is adapted to receive an elastic retraction element 30 or elastic roll-back element 30, adapted to apply a retracting action in outer axial direction XO on said thrust device 13.

According to an embodiment, said first annular housing 15 is delimited at least partially in outer radial direction rO by a first bottom wall 16.

According to a preferred embodiment, said first annular housing 15 is delimited at least partially in inner axial direction XI by a second axial wall 17.

According to a preferred embodiment, said first annular housing 15 is delimited at least partially in outer axial direction XO by a third axial wall 18.

According to a preferred embodiment, at least either said first elongated portion 5 and said second elongated portion 7 further comprises a second annular housing 20 which radially opens into said first annular 15.

According to a preferred embodiment, said second annular chamber 20 is delimited in radial outer direction rO by a chamber bottom arched wall 19 having a chamber bottom arched wall concavity R19 facing in radial inner direction rI which joins in an axial inner portion thereof to said second axial wall 17 and in an axial outer portion thereof to said first bottom wall 16 of said first annular housing 15.

In this manner, said second annular chamber 20 is adapted to receive at least a portion of said elastic retraction element 30 at least when said thrust device 13 applies the thrust action 14.

According to a preferred embodiment, said chamber arched bottom wall 19 has a substantially constant radius of curvature.

According to a preferred embodiment, said first bottom wall 16 of the first annular housing 15 extends substantially along a straight line.

According to a preferred embodiment, said first bottom wall 16 of the first annular housing 15 is tapered in the outer axial direction XO, in other words away from the disc 4. Preferably, said first bottom wall 16 of the first annular housing 15 tapers in outer axial direction XO, forming a first bottom wall angle γ comprised between 6° and 8°, and preferably equal to 7°15'.

According to an embodiment, the chamber bottom arched wall 19 sweeps an arched wall angle α between 170° and 220°. Preferably, said arched wall angle α is comprised between 175° and 200°. According to a preferred embodiment, said arched wall angle α is substantially equal to 180°. According to an embodiment, said arched wall angle α is evaluated on a plane parallel to the axial direction X-X and the radial thrust direction r-r.

According to an embodiment, said chamber bottom arched wall 19 joins the first bottom wall 16 by means of a first connection 22 having first connection concavity R22 opposite with respect to said bottom wall chamber concavity R19. According to an embodiment, said concavity of first connection R22 is directed in outer radial direction rO.

According to an embodiment, said first connection wall 22 sweeps a first connection wall angle δ comprised between 96° and 98°, and preferably substantially equal to 97°15'.

According to an embodiment, said second axial wall (17) extends substantially in thrust device radial direction r-r, preferably tapering in the outer radial direction rO by effect of the draft angles.

Preferably, said caliper body 1 is made of metal using foundry techniques, e.g. sand casting or shell casting. According to an embodiment, said caliper body 1 is made in one piece, e.g. with a single casting.

According to an embodiment, said second axial wall 17 joins said chamber bottom arched wall 19 in thrust device radial direction r-r.

According to an embodiment, said thrust device housing 10 is delimited at least partially in outer radial direction rO by at least one thrust device housing wall 23.

According to an embodiment, said thrust device housing wall 23 joins to said second axial wall 17 by means of an inner axial stretch 24 parallel neither to the thrust device radial direction r-r nor to the axial direction X-X.

According to an embodiment, said inner axial stretch 24 forms an inner axial stretch angle β comprised between 54° and 56° with said second inner axial wall 17. Preferably, said inner axial stretch angle β is substantially equal to 55°.

According to an embodiment, said inner axial stretch 24 forms an inner axial stretch angle β comprised between 54° and 56°, and preferably substantially equal to 55° with the thrust device radial direction r-r.

According to an embodiment, said thrust device housing wall 23 joins to said third axial wall 18 by means of an inner axial stretch 25 parallel neither to the thrust device radial direction r-r nor to the axial direction X-X.

According to an embodiment, said outer axial stretch 25 forms an angle comprised between 44° and 46°, and preferably substantially equal to 45° with the thrust device radial direction r-r.

According to an embodiment, said thrust device housing 10 is delimited in outer axial direction XO by a housing back wall 29.

According to an embodiment, said thrust device housing 10 is substantially cup-shaped.

According to an embodiment, said third axial wall 18 joins to said first bottom wall 16 by means of a radial stretch 26 inclined and parallel neither to the radial direction r-r nor to the axial direction X-X. Preferably, said radial stretch 26 forms an angle comprised between 44° and 46°, and preferably substantially equal to 45° with the thrust device radial direction r-r.

According to a preferred embodiment, said second axial wall 17 of the first annular housing 15 joins to said thrust device housing wall 23 by means of an inner axial stretch 24 which forms an inner axial stretch angle β with the thrust device radial direction r-r, to form an axially inner deformation chamber 37 for said elastic retraction element 30.

According to a preferred embodiment, said inner axial deformation chamber 37 has a wedge-shaped section of a tapering in inner axial direction XI.

According to a preferred embodiment, said inner axial stretch 24 comprises an arched stretch 36 having an inner arched axial stretch concavity R36 facing radial outer direction rO.

The provision of said arched section 36 adapted to abut against an axially inner face of the elastic retraction element 30 makes it possible to reduce the amount of the strains arising on the body of the retraction device 30 during the thrust action 14.

According to a preferred embodiment, said inner axial stretch angle β is comprised between 55° and 75°.

According to an embodiment, e.g. shown in FIG. 12, said inner axial stretch angle β is substantially equal to 60°.

According to an embodiment, e.g. shown in FIG. 16, said inner axial stretch angle β is substantially equal to 70°.

According to a preferred embodiment, said arched stretch 36 connects said inner axial stretch 24 with said second axial wall 17.

According to an embodiment, the radius of curvature of said arched stretch 36 is comprised between 0.25 and 1.30.

According to an embodiment, e.g. shown in FIG. 12, the radius of curvature of said arched stretch portion 36 is substantially equal to 0.30.

According to an embodiment, e.g. shown in FIG. 14, the radius of curvature of said arched stretch portion 36 is substantially equal to 1.25.

According to an embodiment, said first bottom wall 16 connects to said second axial wall 17 by means of an outer radial connection 38. According to an embodiment, said outer radial connection 38 has a radius of curvature comprised between 0.2 and 0.3, and preferably substantially equal to 0.25.

According to an embodiment, a brake caliper 2 comprises a caliper body 1 according to any of the embodiments described above.

According to a preferred embodiment, said brake caliper 2 further comprises at least one pair of brake pads 11, each brake pad 11 comprising friction material 34, adapted to press against a facing braking surface 6 or 8 of the disc 4, and a support plate 33 which supports said friction material 34.

According to a preferred embodiment, said brake caliper 2 further comprises at least one thrust device 13 received in said at least one thrust device housing 10 so that it can slide axially with respect to said thrust device housing 10.

The thrust axis a-a, parallel to the axial direction X-X, the radial thrust direction r-r orthogonal to said thrust axis a-a and incident to it, and the inner radial direction rI directed towards said thrust axis a-a, outer radial direction rO, opposite to said inner radial rI direction, and the circumferential direction of thrust device c-c, are understood to be also defined on said thrust device 13 when at least partially accommodated in said thrust device housing 10.

According to a preferred embodiment, said support plate 33 comprises a back plate 35 or pad back 35 facing opposite with respect to the friction material 34 and adapted to face such a thrust device 13.

According to a preferred embodiment, said thrust device 13 further comprises a thrust surface 32, adapted to abut against said back plate 35 of said brake pad 11, to apply the thrust action 14.

According to a preferred embodiment, at least said one thrust device 13 is in form of a piston having substantially cylindrical geometry which extends about the thrust axis a-a.

According to a preferred embodiment, at least one thrust device 13, comprises an outer wall or skirt 28 directed in axial direction X-X. Preferably, said skirt 28 is also directed in the thrust device circumferential direction c-c.

According to a preferred embodiment, said skirt 28 of the thrust device 13 cooperates with said thrust housing wall 23 of the thrust device housing 10 to guide the movement in axial direction X-X of the thrust device 13 with respect to the caliper body 1. In this manner, said thrust action 14 is applied.

According to an embodiment, said brake caliper 2 further comprises at least one elastic retraction element 30. According to a preferred embodiment, said at least one elastic retraction element 30 has an annular shape and is received in said first annular housing 15.

In operating conditions during the thrust action 14, said at least one elastic retraction element 30 deforms elastically as a result of the inner axial direction XI applied by thrust device 13 towards the disc 4. When the thrust action 14 ceases, the elastic retraction element 30 applies a retracting action on said thrust device 13, moving it away from the plate back 35 by an axial luft distance 31.

According to a preferred embodiment, said brake caliper 2 further comprises at least one axial spring 21 adapted to bias at least one brake pad 11 away from the disc when the retracting action ceases, in other words when the braking action ceases. In this manner, the axial spring 21 carries said plate back 35 against said thrust surface 32 of the thrust device 13.

Fixing means of the vehicle 12, e.g. threaded, may be provided on said caliper body 1, e.g. on said second extended portion 7.

By virtue of the provision of said deformation chamber 37, according to an embodiment, the body of the retraction device 30, during the thrust action 14, deforms elastically in the inner axial direction XI in contact with the skirt 28 of the thrust device 13.

By virtue of the provision of said at least a second chamber 20, according to a preferred embodiment, the body of the retraction device 30, during the thrust action 14, deforms elastically occupying said second chamber 20, thus reducing its axial deformation in said chamber 37, which can, therefore, be made smaller the retracting action being equal, compared to known solutions.

By virtue of the suggested solutions, it is possible to reduce the variability of the axial distance of luft 31, even in prolonged use.

By virtue of suggested solutions, it is possible to reduce the wear of the elastic retraction element 30 by extending its service life.

According to a general embodiment, a disc brake 3 comprises at least one brake caliper 1 according to any one of the embodiments described above.

According to a preferred embodiment, said disc brake 3 comprises at least one disc brake disc 4.

The person skilled in the art may make many changes and adaptations to the embodiments described above or may replace elements with others which are functionally equivalent to satisfy contingent needs without however departing from the scope of the appended claims.

LIST OF REFERENCES

1 Caliper body
2 Brake caliper
3 Disc brake
4 Disc brake disc
5 First elongated portion of the caliper body
6 First braking surface of the disc
7 Second elongated portion of the caliper body
8 Second braking surface of the disc
9 Caliper bridge
10 Thrust device housing or cylinder
11 Brake pad
12 Fixing means to the vehicle
13 Thrust device or piston
14 Thrust action
15 First ring housing
16 First bottom wall of the first annular housing
17 Second axial wall of the first annular housing
18 Third axial wall of the first annular housing
19 Chamber bottom arched wall
20 Second annular chamber
21 Axial spring of the brake caliper
22 First connection, or connection
23 Thrust device housing wall
24 Inner axial stretch
25 Outer axial stretch
26 Inclined radial stretch
27 Dust cuff
28 Thrust device skirt
29 Housing bottom wall
30 Elastic retraction element
31 Axial luft distance, or luft
32 Piston thrust surface
33 Brake pad supporting plate
34 Brake pad friction material
35 Brake pad back, or plate back
36 Arched connection stretch
37 Deformation chamber
38 Outer radial connection
$\alpha$ Arched wall angle
$\beta$ Inner axial stretch angle
$\gamma$ First back wall angle
$\delta$ First connection wall angle
R19 Chamber bottom arched wall concavity
R22 First connection concavity
R36 Arched axial stretch concavity
A-A Disc rotation axis
X-X Disc brake axial direction
XI Inner axial direction
XO Outer axial direction
R-R Disc brake radial direction
T-T Disc brake tangential direction
a-a Thrust axis
r-r Radial direction, or thrust device radial direction
rI Inner radial direction
rO Outer radial direction
c-c Thrust device circumferential direction

The invention claimed is:

1. A caliper body for a brake caliper for a disc brake, wherein said disc brake defines an axial direction (X-X), either coincident with or parallel to a rotation axis (A-A) of a disc of the disc brake; said axial direction (X-X) defines an inner axial direction (XI), directed towards the disc, and an outer axial direction (XO), opposite to said inner axial direction (XI);

wherein said caliper body is configured to straddle the disc, and wherein said caliper body comprises:
a first elongated portion, configured to face a first braking surface of the disc either directly or indirectly by interposing at least one first brake pad;
a second elongated portion, opposite to said first elongated portion and configured to face a second braking surface of the disc opposite to said first braking surface either directly or indirectly by interposing at least one second brake pad;
at least one caliper bridge connecting said first elongated portion and said second elongated portion to each other arranged straddling the disc;
and wherein at least either said first elongated portion or said second elongated portion comprises:
at least one thrust device housing or cylinder, configured to receive at least one portion of a thrust device, configured to apply a thrust action directed in the inner axial direction (XI) on at least one brake pad to abut said at least one brake pad against a braking surface of the disc;
said at least one thrust device housing extending about a thrust axis (a-a), parallel to the axial direction (X-X), and defining a radial direction (r-r) orthogonal to said thrust axis (a-a) and incident thereto, said radial direction (r-r) defining an inner radial direction (rI) directed towards said thrust axis (a-a) and an outer radial direction (rO), opposite to said inner radial direction (rI);
a first annular housing which radially opens into said at least one thrust device housing, said first annular housing being configured to receive an elastic retraction element, configured to apply a retracting action in the outer axial direction (XO) on said thrust device; said first annular housing being at least partially delimited in the outer radial direction (rO) by a first bottom wall, and in the inner axial direction (XI) by a second axial wall; and a second annular chamber which radially opens into said first annular housing, said second annular chamber being delimited in the outer radial direction (rO) by a chamber bottom arched wall having a chamber bottom arched wall concavity facing in the inner radial direction (rI) that joins in an inner axial portion thereof to said second axial wall and in an outer axial portion thereof to said first bottom wall of said first annular housing, so that said second annular chamber receives at least one portion of said elastic retraction element at least when said thrust device applies the thrust action, wherein said second axial wall joins said chamber bottom arched wall in continuous manner, without forming edges, said chamber bottom arched wall is arched with a constant curvature radius;

said first bottom wall of the first annular housing extends along a straight line;

said first bottom wall of the first annular housing tapers in the outer axial direction (XO), forming a first bottom wall angle ($\gamma$) comprised between 6° and 8°; and/or wherein said first bottom wall, said chamber bottom arched wall and said second axial wall are mutually in succession and connected to avoid edges therebetween, said chamber bottom arched wall sweeps an arched wall angle ($\alpha$) comprised between 170° and 220°;

said arched wall angle ($\alpha$) is evaluated on a plane parallel to the axial direction (X-X) and the radial direction (r-r);

said chamber bottom arched wall joins the first bottom wall by a first connection having a first connection concavity opposite to said chamber bottom arched wall concavity; and said first connection sweeps an angle comprised between 96° and 98°.

2. The caliper body of claim 1, wherein:

said second axial wall extends in the radial direction (r-r);

said second axial wall joins said chamber bottom arched wall in the radial direction (r-r).

3. A caliper body for a brake caliper for a disc brake, wherein said disc brake defines an axial direction (X-X), either coincident with or parallel to a rotation axis (A-A) of a disc of the disc brake; said axial direction (X-X) defines an inner axial direction (XI), directed towards the disc, and an outer axial direction (XO), opposite to said inner axial direction (XI);

wherein said caliper body is configured to straddle the disc, and wherein said caliper body comprises:

a first elongated portion, configured to face a first braking surface of the disc either directly or indirectly by interposing at least one first brake pad;

a second elongated portion, opposite to said first elongated portion and configured to face a second braking surface of the disc opposite to said first braking surface either directly or indirectly by interposing at least one second brake pad;

at least one caliper bridge connecting said first elongated portion and said second elongated portion to each other arranged straddling the disc;

and wherein at least either said first elongated portion or said second elongated portion comprises:

at least one thrust device housing or cylinder, configured to receive at least one portion of a thrust device, configured to apply a thrust action directed in the inner axial direction (XI) on at least one brake pad to abut said at least one brake pad against a braking surface of the disc;

said at least one thrust device housing extending about a thrust axis (a-a), parallel to the axial direction (X-X), and defining a radial direction (r-r) orthogonal to said thrust axis (a-a) and incident thereto, said radial direction (r-r) defining an inner radial direction (rI) directed towards said thrust axis (a-a) and an outer radial direction (rO), opposite to said inner radial direction (rI);

a first annular housing which radially opens into said at least one thrust device housing, said first annular housing being configured to receive an elastic retraction element, configured to apply a retracting action in the outer axial direction (XO) on said thrust device; said first annular housing being at least partially delimited in the outer radial direction (rO) by a first bottom wall, and in the inner axial direction (XI) by a second axial wall; and a second annular chamber which radially opens into said first annular housing, said second annular chamber being delimited in the outer radial direction (rO) by a chamber bottom arched wall having a chamber bottom arched wall concavity facing in the inner radial direction (rI) that joins in an inner axial portion thereof to said second axial wall and in an outer axial portion thereof to said first bottom wall of said first annular housing, so that said second annular chamber receives at least one portion of said elastic retraction element at least when said thrust device applies the thrust action, wherein said second axial wall joins said chamber bottom arched wall in continuous manner, without forming edges, said at least one thrust device housing is at least partially delimited in the outer radial direction (rO) by a thrust device housing wall;

said thrust device housing wall joins to said second axial wall by an inner axial stretch parallel neither to the radial direction (r-r) nor to the axial direction (X-X);

said inner axial stretch forms an inner axial stretch angle ($\beta$) comprised between 54° and 56° with said second inner axial wall; and/or wherein said inner axial stretch forms an inner axial stretch angle ($\beta$) comprised between 54° and 56° with the radial direction (r-r);

said second axial wall and said inner axial stretch are mutually in succession and connected to avoid edges therebetween; and/or wherein said first bottom wall, said chamber bottom arched wall, said second axial wall and said inner axial stretch are mutually in succession and connected to avoid edges therebetween.

4. The caliper body of claim 3, wherein said thrust device housing wall joins to a third axial wall which delimits said first annular housing in the outer axial direction (XO) by an outer axial stretch parallel neither to the radial direction (r-r) nor to the axial direction (X-X), and said outer axial stretch forms an angle comprised between 44° and 46° with the radial direction (r-r).

5. A brake caliper comprising a caliper body for a brake caliper for a disc brake, wherein said disc brake defines an axial direction (X-X), either coincident with or parallel to a rotation axis (A-A) of a disc of the disc brake; said axial direction (X-X) defines an inner axial direction (XI), directed towards the disc, and an outer axial direction (XO), opposite to said inner axial direction (XI);

wherein said caliper body is configured to straddle the disc;

and wherein said caliper body comprises:

a first elongated portion, configured to face a first braking surface of the disc either directly or indirectly by interposing at least one first brake pad;

a second elongated portion, opposite to said first elongated portion and configured to face a second braking surface of the disc opposite to said first braking surface either directly or indirectly by interposing at least one second brake pad;

at least one caliper bridge connecting said first elongated portion and said second elongated portion to each other arranged straddling the disc;

and wherein at least either said first elongated portion or said second elongated portion comprises:

at least one thrust device housing or cylinder, configured to receive at least one portion of a thrust device, configured to apply a thrust action directed in the inner axial direction (XI) on at least one brake pad to abut said at least one brake pad against a braking surface of the disc;

said at least one thrust device housing extending about a thrust axis (a-a), parallel to the axial direction (X-X), and defining a radial direction (r-r) orthogonal to said thrust axis (a-a) and incident thereto; said radial direction (r-r) defining an inner radial direction (rI) directed towards said thrust axis (a-a) and an outer radial direction (rO), opposite to said inner radial direction (rI);

a first annular housing which radially opens into said at least one thrust device housing, said first annular housing being configured to receive an elastic retraction element, configured to apply a retracting action in the outer axial direction (XO) on said thrust device; said first annular housing being at least partially delimited in the outer radial direction (rO) by a first bottom wall, and in the inner axial direction (XI) by a second axial wall; and a second annular chamber which radially opens into said first annular housing, said second annular chamber being delimited in the outer radial direction (rO) by a chamber bottom arched wall having a chamber bottom arched wall concavity facing in the inner radial direction (rI) that joins in an inner axial portion thereof to said second axial wall and in an outer axial portion thereof to said first bottom wall of said first annular housing, so that said second annular chamber receives at least one portion of said elastic retraction element at least when said thrust device applies the thrust action, wherein said second axial wall joins said chamber bottom arched wall in continuous manner, without forming edges, and wherein said at least one thrust device housing is at least partially delimited in the outer radial direction (rO) by a thrust device housing wall;

said at least one thrust device housing is at least partially delimited in the outer radial direction (rO) by a thrust device housing wall;

said thrust device housing wall joins to said second axial wall by an inner axial stretch parallel neither to the radial direction (r-r) nor to the axial direction (X-X);

said inner axial stretch forms an inner axial stretch angle (β) comprised between 54° and 56° with said second inner axial wall; and/or wherein said inner axial stretch forms an inner axial stretch angle (β) comprised between 54° and 56° with the radial direction (r-r);

said second axial wall and said inner axial stretch are mutually in succession and connected to avoid edges therebetween; and/or wherein said first bottom wall, said chamber bottom arched wall, said second axial wall and said inner axial stretch are mutually in succession and connected to avoid edges therebetween.

6. The brake caliper of claim 5, further comprising:

at least one thrust device received in said at least one thrust device housing so that said at least one thrust device axially slides with respect to said at least one thrust device housing; and at least one elastic retraction element; wherein said at least one elastic retraction element has an annular shape and is received in said first annular housing;

said at least one thrust device is in form of a piston having cylindrical geometry which extends about the thrust axis (a-a);

said at least one thrust device comprises a skirt directed in axial direction (X-X); and wherein said skirt cooperates with said thrust device housing wall to guide movement in the axial direction (X-X) of the at least one thrust device with respect to the caliper body.

7. The brake caliper of claim 5, further comprising at least one pair of brake pads, each brake pad comprising friction material adapted to press against a braking surface of the disc, and a support plate supporting said friction material; wherein said support plate comprises a back plate facing opposite with respect to the friction material and configured to face said at least one thrust device;

said thrust device further comprises a thrust surface, configured to abut against said back plate, to apply the thrust action; and said brake caliper further comprises at least one axial spring configured to bias at least one brake pad away from the disc.

8. A disc brake comprising at least one brake caliper according to claim 5.

9. A caliper body for a brake caliper for a disc brake, wherein said disc brake defines an axial direction, either coincident with or parallel to a rotation axis of a disc of the disc brake; said axial direction defines an inner axial direction, directed towards the disc, and an outer axial direction, opposite to said inner axial direction, wherein said caliper body comprises:

at least one thrust device housing configured to receive at least one portion of a thrust device;

a first annular housing which radially opens into said at least one thrust device housing, said first annular housing being configured to receive an elastic retraction element, configured to apply a retracting action in the outer axial direction on said thrust device, said first annular housing being delimited by an inner axial stretch transitioning directly to a first axially extending wall, transitioning directly to a hemispherical wall, transitioning directly to a downwardly extending bottom wall extending at a first angle, transitioning directly to an downwardly extending radial stretch extending a second angle greater than the first angle, transitioning directly to a second axial wall extending parallel the first axially extending wall, transitioning directly to an outer axial stretch extending at an acute angle.

\* \* \* \* \*